July 4, 1950  H. GUTTON  2,513,478
MEANS FOR OBTAINING EMISSION IMPULSES OF CONSTANT
WIDTH AND AMPLITUDE IN A TARGET DETECTOR
Filed May 2, 1947
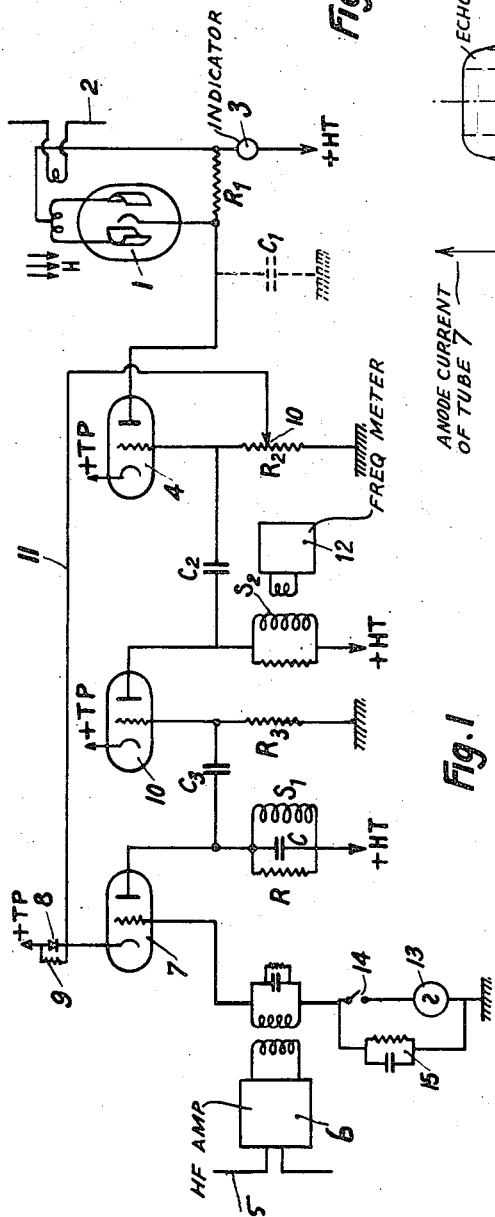
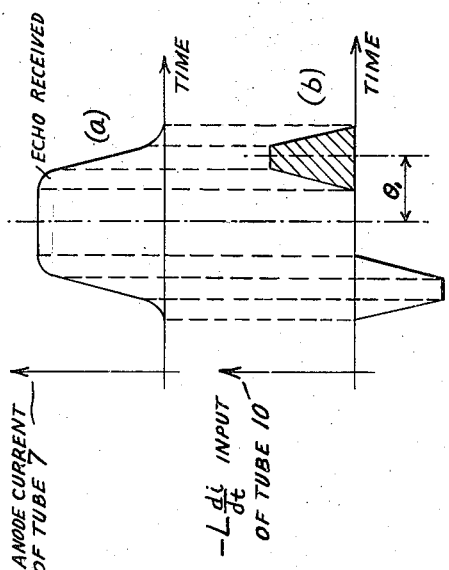
Inventor
HENRI GUTTON
By
Haseltine, Lake & Co.
Agents

Patented July 4, 1950

2,513,478

UNITED STATES PATENT OFFICE 2,513,478

MEANS FOR OBTAINING EMISSION IMPULSES OF CONSTANT WIDTH AND AMPLITUDE IN A TARGET DETECTOR

Henri Gutton, Paris, France, assignor to Compagnie Generale de Telegraphie sans Fil, a corporation of France Application May 2, 1947, Serial No. 745,539
In France May 21, 1941

Section 1, Public Law 690, August 8, 1946
Patent expires May 21, 1961

2 Claims. (Cl. 343—13)

The present invention is relating to a system for measuring distances by means of echoes.

Systems are already known for measuring distances between one given point and an obstacle, wherein a transmitter installed at the given point sends out brief signals or "pips" of a short duration on a wave which may be hertzian, acoustic, ultra-sonic or infra-red luminous. This wave reflects on the obstacle and the return wave is detected by a receiver which is situated in the vicinity of the transmitter. A particular pip returns back to the transmitter after a time $\theta$ which is related to the distance D through the equation $$\theta = \frac{2D}{3 \cdot 10^8}$$

By measuring the time $\theta$ in seconds, the distance D is determined in metres. $\theta$ is generally measured by translating the time into an elongation of a measuring apparatus or meter, for instance by using a cathode-ray oscillograph tube, the horizontal axis of which is swept proportionally to time and the vertical deflection of which is controlled by the echo. The distance is then directly read on the screen of the oscillograph tube.

The drawback of this system is to require a very high stability of the scanning voltages; actually, the error in the readings is of the same order as the variations of the supply voltage. Furthermore, the modification in the course of time of the capacities, valves and resistors which are used for obtaining the scanning, permits only with difficulty of ensuring the stability of the calibration of the oscillograph tube in course of time.

Moreover, the precision in the reading on the screen of the oscillograph tube is subjected to errors of parallax through the glass of the bulb, as well as to those which originate from the defects of the oscillograph tube or from the sharpness of definition of the tracing of the diagram. Lastly, the device must be calibrated afresh after every replacement of the oscillograph tube.

What the present invention aims at, is to overcome the enumerated disadvantages and determine the distance from the obstacle with an increased precision.

The principle of the invention consists, instead of translating the time necessary for the echo to return into an elongation, in translating it into a frequency the measurement of which may be obtained by a known instrument with a great precision e. g. to 0.01%. To this end, the transmission of every consecutive pip is released by the return of the preceding pip which is suitably amplified, the appropriate arrangements being made for giving back to the same the shape it possessed at the time of the transmission. With this method, the spacing of the pips is a direct function of the distance from the obstacle; by measuring their frequency, one will determine the distance.

The invention will be more readily understood with reference to the accompanying drawings in which:

Fig. 1 shows a device according to the invention, wherein the oscillator is a magnetron; and Figure 2 is a diagram of the impulses appearing at the anodes of the amplifiers and at inductances inserted in the anode circuits.

The system comprises a transmitter of a very high frequency consisting of a valve oscillator, e. g. a magnetron 1 functioning in a magnetic field H and coupled to a directive aerial 2. The anode of the magnetron is connected to the high tension source +HT through an indicating instrument 3. The internal space of the magnetron is connected in series with the internal space of the valve 4 controlling the impulses, the plate of which is supplied by +HT through a resistor $R_1$ which shunts the internal space of the magnetron. The time constant resulting from the resistor $R_1$ and from the capacity $C_1$ in dotted lines, existing between the anode of the control valve and the cathode of the oscillating tube on the one hand, and the ground on the other, must remain negligible with respect to the duration of the pip. This condition limits the value of $R_1$. The grid of the valve 4 is brought to a negative potential by means of a positive bias +TP applied to the cathode of the valve. The valve 4 is then normally in such a condition that it prevents the magnetron from oscillating. It is only when a sufficiently strong impulse is produced across the terminals of resistor $R_2$ that the internal space of valve 4 becomes permeable and the magnetron 1 starts oscillating. The aerial 2 radiates then a high frequency pip, the exterior envelope of which follows the shape of the impulse brought on to the resistor $R_2$.

In order to control the transmission of the pips by the echo returned of the same pips, there is arranged a receiving aerial 5 which feeds to a high frequency amplifier 6. The design of this amplifier proceeds from current technique; the only condition it has to submit to is to have a sufficiently wide passing band for letting through without deformation the signal on a sufficiently high carrier frequency which is transmitted by the oscillator. For instance, with a signal of 3 micro-seconds' duration, the passing band must be at least 2,000 kilocycles.

At the outlet of the amplifier 6, the signal is led to the grid circuit of a detector 7 which will be for instance a triode arranged for detecting through the anode characteristic curve. The cathode of the valve 7 is positively biassed in a suitable manner by the source +TP through a rectifier 8 shunted by a resistor 9 the role of which will be described hereafter.

The anode circuit of valve 7 includes a resistor R, a condenser C and a damped self-inductance $S_1$, which is capable of oscillating freely on a natural frequency which is near to the width of the pip. The condenser C which is of small value, is intended to eliminate the high-frequency.

The signal collected across the terminals of the self-inductance $S_1$ is forwarded through the condenser $C_3$ and the resistor $R_3$ to the grid of an amplifier stage 10, the cathode of which is positively biassed by +TP far enough for blocking it. The positive portion of the signal unbiasses the valve for a short moment. There is disposed a damped self-inductance $S_2$, similar to self-inductance $S_1$, in the anode circuit.

The stage 10 could be followed by a certain number of similar stages, which number ought to be sufficient for the positive position of the signal at the output to be strong enough for exciting at least on to zero potential the grid of the valve 4 controlling the impulses.

In the example described, it was thought sufficient to have one single stage 10, the output voltage of which is transmitted through condenser $C_2$ across the terminals of the resistor $R_2$ in the grid circuit of the valve controlling the impulses.

The stages 7 and 10 serve to correct the form and amplitude of the signals received in such manner that every impulse brought on to $R_2$ releases the sending out through oscillator 1 of a pip having a duration and an amplitude which are equal to those of the preceding pip. For a better understanding of this correcting mechanism, one will have to refer to Figure 2 that shows in the top part (a) thereof, a form of the signal brought on to the valve 7, drawn against time. This signal, in turn appearing as a potential $$e = -L\frac{di}{dt}$$

in accordance with the fundamental laws of induction, produces in the self-inductance a shock that is the cause of free oscillations of the same self-inductance, the curve of which oscillations is represented in the bottom part (b) of Figure 2. For this reason, the lower half of Figure 2 shows two half impulses corresponding to the transmitted pip. The hatched positive portion of the impulse is also amplified by tube 10 and the terminals of inductance $S_2$ yield a further positive impulse which still lags by an amount $\theta$, behind the hatched impulse. This process continues, and the successive leveling enables the obtaining of a pip having a constant amplitude and width. The shape of the pipe may be corrected by adjusting the value of the natural frequency of the self-inductance $S_1$. It is advantageous that this natural frequency should be as high as possible with as great an inductance as possible. The self-inductance is damped by a resistor R at critical damping.

It is to be remarked that the positive portion of the signal thus formed lags with respect to the inlet signal by a time $\theta_1$ which is approximately equal to the mean width of the pip, and also that the width of the positive portion of the pip is only a function of the natural frequency of the self-inductance; on the other hand, it depends very little on the amplitude of the initial signal.

The positive portion above the line AB of Figure 2 of the signal across the terminals of the self-inductance $S_1$, being used for exciting the stage 10, the same process is repeated, and there is obtained, across the terminals of $S_2$, a signal the positive portion of which also lags by $\theta_1$ with respect to the inlet signal of the stage 10, and the amplitude of which is corrected by the amplification so as to act on the grid of the valve 4 in a suitable manner.

The detecting and amplifying stages thus delay the signal by a constant time equal to $n\theta_1$, where $\theta_1$ is a time approximately equal to half the duration of the initial pip and $n$ is the number of the self-inductance $S_1$, $S_2$,... and of the eventual similar, further self-inductances in the event when several amplifying stages are used.

The system works in the following manner:

Supposing a pip transmitted by aerial 2, and no echo resulting, aerial 5 receives immediately the direct wave of the transmitter through the shorter path. This signal is amplified by 6, detected by 7 and amplified by 10. It comes back to the valve 4 after a constant time $n\theta_1$. Should this signal control the transmission of a new pip, one would obtain a recurrence of signals at the frequence $$\frac{1}{n\theta_1}$$

It is therefore necessary to do away with it by blocking at the time of the transmission of the pip one of the valves of the receiver, say the detecting valve. To this end, one may take off a part of the voltage on resistor $R_2$ by means of the tapping 10 and bring it through the lead 11 on to the cathode of the detecting valve 7. The rectifier 8 is provided in order that the positive portion of the tapped voltage should act alone on the cathode and create the bias necessary for the blocking. In this manner, if no echo takes place, the pip is not renewed.

On the contrary, should there occur an echo caused by an obstacle at a distance D, the signal transmitted is received at 5 after a time $$\theta = \frac{2D}{3 \cdot 10^8}$$

then amplified and detected with a delay of $n\theta_1$, and finally transmitted again by the transmitter after a time $\theta + n\theta_1$.

The frequency $$\frac{1}{\theta n\theta_1}$$

may be measured by means of a precise frequency meter 12 coupled for instance with the self-inductance $S_2$, which has no need to be described in detail.

It will be remarked that the existence of the delay $n\theta_1$ is important for the invention: if this delay were nil, the signal due to the echo would not actually have time to pass through before the receiver would be blocked by the impulse controlling the emission. On the other hand, this delay must not be too important so that $n\theta_1$ could be neglected in comparison with $\theta$ and it might be admitted that the frequency meter indicates $$\frac{1}{\theta}$$

that is, a quantity permitting of determining the distance D in an inequivocal manner. Experience shows that it is practically possible to maintain $n\theta_1$ at a very low value.

In the event that there would be no obstacle creating an echo, it is necessary that from time to time a watch pip for testing the eventual obstacles should be sent from the transmitter. To this end, there may be arranged in the inlet circuit of the receiver a device that transmits watch pips at a very low frequency. One may dispose for instance in the grid circuit of the valve 7 a generator 13, operating at 50 periods per second for instance, in series with a switch 14, the whole being shunted by a group formed by condenser and resistor 15.

In the absence of an echo, the switch 14 is closed, and the transmitter sends only 50 pips per second, the repetition of each of these pips being suppressed in the intervals between pips by the device 8, 9, 10, 11. When an echo is detected, which is recognized either by the increase of current of the ammeter 3, or by the working of a suitable indicator which acts upon a change in the current, the watch signal is suppressed by the opening of switch 14 and the frequency is measured by means of the frequency meter 12. The circuit 15 serves then to restore the grid circuit of the valve 7.

What I claim is:

1. In a system for electromagnetic target location which includes means for transmitting pips and receiving the echo of said pips, and wherein the pips are released by echo signals, the distance to said target being measured by the frequency of the received echoes, a device for imparting constant amplitude and width to said pips, said device comprising means connected to said receiving means for detecting said echoes, a winding connected to said detecting means and tuned to a frequency corresponding to a period equal to the duration of said pips, a resistance shunting said winding, a plurality of amplifying relay tubes connected in succession, the grid of the first tube being connected to said winding and the grid circuit of each of the other tubes being connected to the plate circuit of the preceding tube through a winding shunted by a resistance and tuned also to the duration of said pips, and means for applying to said transmitting means the potential appearing in the winding associated with the last of said tubes.

2. In a system for electromagnetic target location which includes a magnetron for transmitting pips and a receiver for the echo of said pips, and wherein the pips are released by echo signals, a device for imparting constant amplitude and width to said pips, said device comprising a tube for detecting said echoes having a grid connected to said receiver, a winding connected to the anode circuit of said tube and tuned to a frequency corresponding to a period equal to the duration of said pips, a resistance shunting said winding, an amplifying relay tube having a grid connected to said winding through a capacity, a winding connected to the anode of said relay tube and tuned also to the duration of said pips, a resistance shunting said last-mentioned winding, a further amplifying relay tube having a grid connected to said last-mentioned winding through a capacity and an anode connected to the cathode of said magnetron, and means for applying to the cathodes of said detecting and amplifying relay tubes a positive polarity relatively to the grids thereof.

HENRI GUTTON.

REFERENCES CITED

The following references are of record in the file of this patent:

UNITED STATES PATENTS

| Number | Name | Date |
|---|---|---|
| 1,945,952 | Nicolson | Feb. 6, 1934 |
| 2,333,688 | Shephard | Nov. 9, 1943 |

FOREIGN PATENTS

| Number | Country | Date |
|---|---|---|
| 302,602 | Great Britain | May 30, 1929 |